United States Patent
Kleczewski

(10) Patent No.: US 11,142,408 B2
(45) Date of Patent: Oct. 12, 2021

(54) WEIGHING AND SORTING ROLLER BELT CONVEYOR AND ASSOCIATED METHOD

(71) Applicant: Laitram, L.L.C., Harahan, LA (US)

(72) Inventor: Lazlo Kleczewski, Oostzaan (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/640,445

(22) PCT Filed: Aug. 21, 2018

(86) PCT No.: PCT/US2018/047139
§ 371 (c)(1),
(2) Date: Feb. 20, 2020

(87) PCT Pub. No.: WO2019/050667
PCT Pub. Date: Mar. 14, 2019

(65) Prior Publication Data
US 2020/0189861 A1    Jun. 18, 2020

Related U.S. Application Data

(60) Provisional application No. 62/556,585, filed on Sep. 11, 2017.

(51) Int. Cl.
*B65G 47/71* (2006.01)
*B07C 5/18* (2006.01)
(Continued)

(52) U.S. Cl.
CPC ............... *B65G 47/71* (2013.01); *B07C 5/18* (2013.01); *B07C 5/36* (2013.01); *B65G 17/083* (2013.01);
(Continued)

(58) Field of Classification Search
CPC ............... B65G 47/71; B65G 43/08; B65G 2203/0258; B65G 2207/34; B07C 5/16;
(Continued)

(56) References Cited

U.S. PATENT DOCUMENTS 3,651,936 A * 3/1972 Powell ............... G01F 19/00
209/564
5,101,982 A  4/1992 Gentili
(Continued)

FOREIGN PATENT DOCUMENTS

CN  106042077 A  10/2016
CN  206184790 U  5/2017
(Continued)

OTHER PUBLICATIONS

Extended European Search Report of European Patent Application No. 18853211.3, dated Mar. 17, 2021, European Patent Office, Munich, Germany.

*Primary Examiner* — Gene O Crawford
*Assistant Examiner* — Lester Ill Rushin
(74) *Attorney, Agent, or Firm* — James T. Cronvich

(57) ABSTRACT

An integral weighing and sorting system that weighs articles on a roller belt and selectively actuates or deactuates belt rollers to divert selected articles. After an article is weighed on the roller belt, its weight is compared to a predetermined weight range. Out-of-range articles are directed to exit the (Continued)

belt via a different route from that of in-range articles by actuating the rollers to rotate in a direction transverse to the travel direction in a roller-actuation zone.

27 Claims, 3 Drawing Sheets

(51) Int. Cl.
    *B07C 5/36*     (2006.01)
    *B65G 17/08*     (2006.01)
    *B65G 43/08*     (2006.01)
    *B65G 47/68*     (2006.01)

(52) U.S. Cl.
    CPC .......... *B65G 43/08* (2013.01); *B65G 47/682* (2013.01); *B65G 2203/0258* (2013.01); *B65G 2207/34* (2013.01)

(58) Field of Classification Search
    CPC .......... B07C 5/18; B07C 5/36; B07C 17/083; G01G 11/00
    USPC ............................................ 198/341.08, 502
    See application file for complete search history.

(56) References Cited

U.S. PATENT DOCUMENTS

| | | | |
|---|---|---|---|
| 7,007,807 B1 * | 3/2006 | Stockard | A21B 1/48 |
| | | | 209/592 |
| 7,344,018 B2 | 3/2008 | Costanzo et al. | |
| 10,518,975 B2 | 12/2019 | Itoh et al. | |
| 10,532,894 B2 * | 1/2020 | Kuhn | B65G 13/071 |
| 2015/0151921 A1 | 6/2015 | Savoye | |
| 2015/0225179 A1 | 8/2015 | Araki et al. | |
| 2016/0039611 A1 * | 2/2016 | Hoynash | B65G 17/345 |
| | | | 198/358 |
| 2016/0052722 A1 | 2/2016 | Fujihara et al. | |
| 2016/0103084 A1 | 4/2016 | Kleczewski | |
| 2018/0111166 A1 | 4/2018 | Ragan | |
| 2019/0176210 A1 * | 6/2019 | Wang | B23P 19/002 |

FOREIGN PATENT DOCUMENTS

| | | |
|---|---|---|
| CN | 110864778 A * | 3/2020 |
| WO | 2013071375 A1 | 5/2013 |
| WO | 2017 A1 | 11/2017 |

* cited by examiner

WEIGHING AND SORTING ROLLER BELT CONVEYOR AND ASSOCIATED METHOD

BACKGROUND

The invention relates generally to power-driven belt conveyors. In particular, it relates to conveyors, and methods of their operation, in which articles are weighed on a conveyor belt having rollers that are selectively actuated to direct articles along different paths according to their weights.

Conveyor belts are often used to convey products through weighing stations such as checkweighers. If a product's weight is outside an acceptable range, the product is separated from the acceptable products. The separation is typically achieved by positioning a rejector downstream of a weighing station to divert rejected, out-of-range products to a reject conveyor for corrective action. The transfer of products from one device—the weighing system—to a second device—the rejector—can cause positioning errors that result in false rejects. And using two separate devices adds complexity and risk.

SUMMARY

One version of a weighing system embodying features of the invention comprises a conveyor belt arranged to advance in a travel direction along a travel path from an upstream end to a downstream end. The conveyor belt has article-supporting rollers that can be actuated to rotate toward a side of the conveyor belt in a transverse direction transverse to the travel direction. A weighing zone extends along a first length of the travel path in which one or more weight sensors measure the weights of articles conveyed by the conveyor belt and produce weight signals indicative of the weights of the articles. A roller-actuation zone extends along a second length of the travel path in which an actuator selectively actuates the article-supporting rollers as they pass through to push articles in the transverse direction. A controller receives the weight signals, determines the weights of the articles from the weight signals, and selectively actuates and deactuates the rollers passing through the roller-actuation zone as a function of the weights of the articles. The weighing zone and the roller-actuation zone can be spaced apart from each other, overlapping, or coincident.

In another aspect, a method for selectively separating articles by weight embodying features of the invention comprises: (a) conveying articles atop belt rollers in a conveyor belt in a travel direction; (b) weighing the articles as they are conveyed atop the belt rollers through a weighing zone; (c) comparing the weights of the articles to a predetermined weight range; and (d) selectively actuating and deactuating the rollers passing through the roller-actuation zone as a function of the weights of the articles.

DETAILED DESCRIPTION

Figure 1:
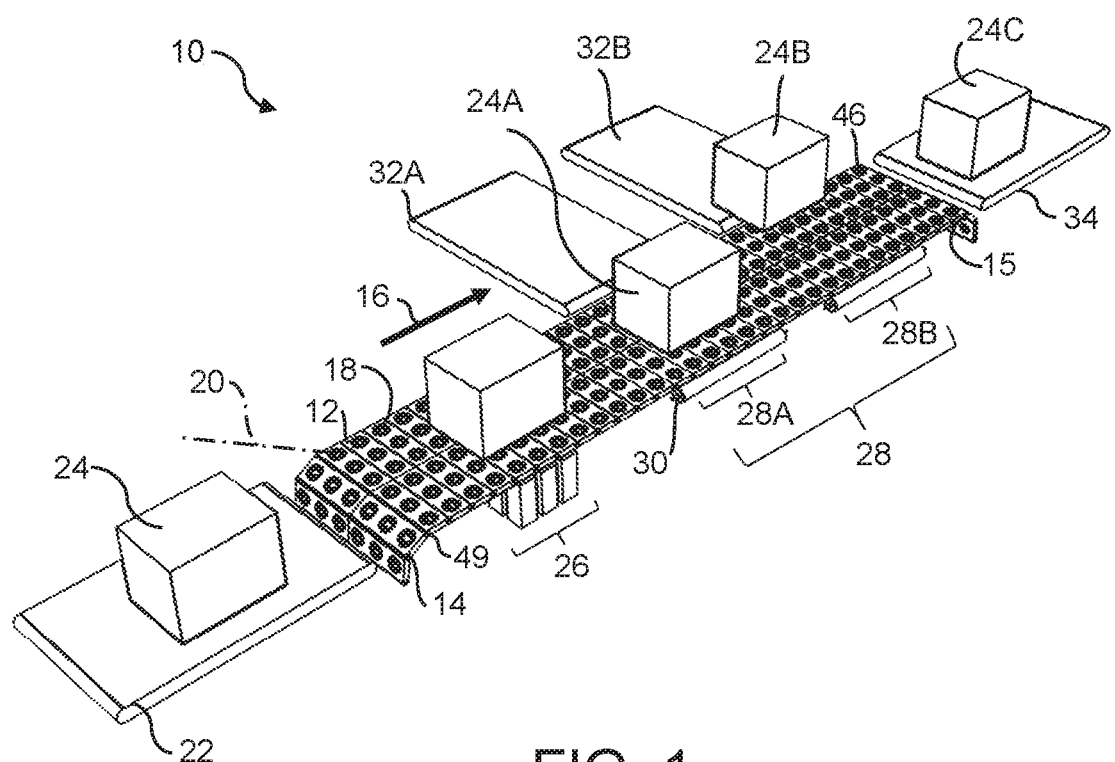
FIG. 1 is a perspective view of one version of a weighing system embodying features of the invention.

One version of a weighing system embodying features of the invention is shown in FIG. 1. The weighing system 10 includes a conveyor belt 12 advancing along a travel path from an upstream end 14 to a downstream end 15 in a travel direction 16. The conveyor belt 12 is a roller belt having a plurality of article-supporting belt rollers 18 extending above the belt's outer face. The belt rollers 18 shown in FIG. 1 are arranged to rotate on axes 20 oblique to the travel direction 16. One example of roller belt with obliquely rotatable rollers is disclosed in U.S. Pat. No. 6,968,941, "Apparatus and Methods for Conveying Objects," Matthew L. Fourney, Nov. 29, 2005. Commercial versions include the INTRALOX® Series 400 Angled Roller Belt manufactured and sold by Intralox, L.L.C. of Harahan, La., U.S.A. Another example of a roller belt is disclosed in U.S. Pat. No. 7,506,751, "Conveyor Systems for Diverting Objects," Matthew L. Fourney, Mar. 24, 2009. The rollers described in that patent rotate on axes parallel to the travel direction. Commercial versions include the INTRALOX® Series 7000 Belt. Yet another roller belt is the ball belt disclosed in U.S. Pat. No. 7,216,759, "Conveyor Belt Modules with Embedded Spherical Rollers Retained in the Modules," Brien G. Rau et al., May 15, 2007. The spherical rollers described in that patent rotate about all axes. Commercial versions include the INTRALOX® Series 400 Ball Belt. Or the rollers can be stacked oblique rollers in which a bottom roller is actuated to rotate a top article-supporting roller in the opposite direction. A roller belt with stacked rollers is disclosed in U.S. Pat. No. 7,360,641, "Conveyor Belt Having Rollers that Displace Objects," Matthew L. Fourney, Apr. 22, 2008. Commercial versions include the INTRALOX® Series 4550 DARB Belt. The disclosures of those four patents are incorporated into this application by reference.

An infeed conveyor 22 feeds articles 24 onto the roller belt 12 at the upstream end 14 of the weighing system 10. The articles 24 sit atop the rollers 18 and are conveyed along a first length of the travel path through a weighing zone 26. Because the belt rollers 18 are not actuated in the weighing zone 26, the articles 24 pass through the weighing zone without being diverted from the travel direction 16 by the rollers. The articles 24 are weighed as they pass through the weighing zone 26. The conveyor belt 12 then conveys the articles into a second length of the travel path defined by a roller-actuation, or sorting, zone 28 downstream of the weighing zone 26. In this version the roller-actuation zone 28 comprises two sequential roller-actuation subzones 28A, 28B. Actuators 30 in the roller-actuation zone 28 are selectively actuated and deactuated as a function of the weights of the articles atop the rollers. For example, when actuated, the actuator 30 causes the belt rollers 18 to rotate on their axes 20 oblique to the travel direction and to push articles, such as out-of-range articles 24A, 24B whose weights are outside a predetermined acceptable weight range, off the side of the belt and onto reject conveyors 32A, 32B. Weights outside the acceptable weight range can be can be divided into two or more unacceptable subranges. For example, the two roller-actuation zones as in the version shown in FIG. 1 could each correspond to one of two unacceptable weight ranges. All the out-of-range articles 24A whose weights are less than a predetermined unacceptable weight could be diverted in the first roller-actuation subzone 28A, and all those articles 24B whose weights exceed the predetermined unacceptable weight could be diverted off in the second subzone 28B. The rollers 18 supporting acceptable in-range articles 24C are deactuated as they pass through the roller-actuation zone 28. The acceptable articles are delivered over the conveyor's downstream end 15 to a discharge conveyor 34. In that way rejected out-of-range articles 24A, 24B exit the conveyor belt 12 along a different path from the in-range articles 24C. And because a single conveyor belt 12 conveys the articles 24 through both the weighing zone 26 and the roller-actuation zone 28 without intervening belt-to-belt transfers, false rejects due to positioning errors are reduced. More than two roller-actuation subzones could be used to sort out-of-range articles to multiple reject conveyors according to out-of-range weight subranges into which they fall. Or the sorting can be organized according to other criteria, such as destination and package type, as just two examples.

Figures 2A, 2B:
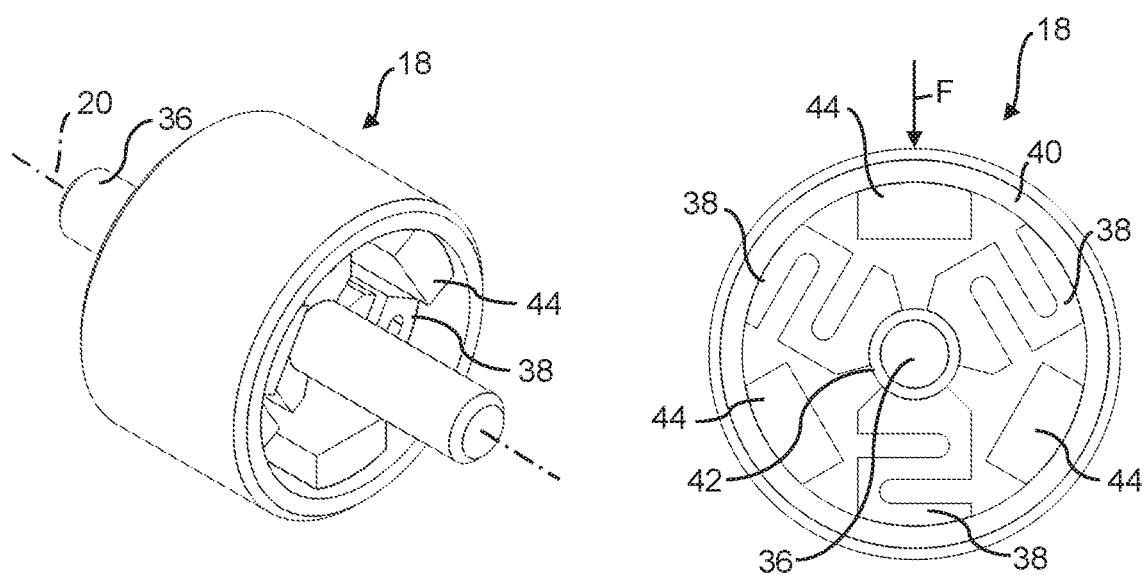
FIGS. 2A and 2B are enlarged isometric and side views of a belt roller with an embedded weight sensor usable in a weighing system as in FIG. 1.

FIGS. 2A and 2B show a belt roller 18 with a weight sensor to measure the weights of articles. The cylindrical roller 18 is mounted on an axle 36 that defines the roller's axis of rotation 20. The weight sensor comprises three load cells 38, which are connected between the roller's periphery 40 and a hub 42 surrounding the axle 36. The three load cells 38 in this example are equi-spaced around the axle 36. The load cells 38 are electrically connected to associated support circuitry 44. The three load cells 38 resolve the downward force F, which is proportional to the weight of an article sitting atop the roller. The sums of the downward forces on all the rollers supporting an article equal the article's total weight.

Figure 3:
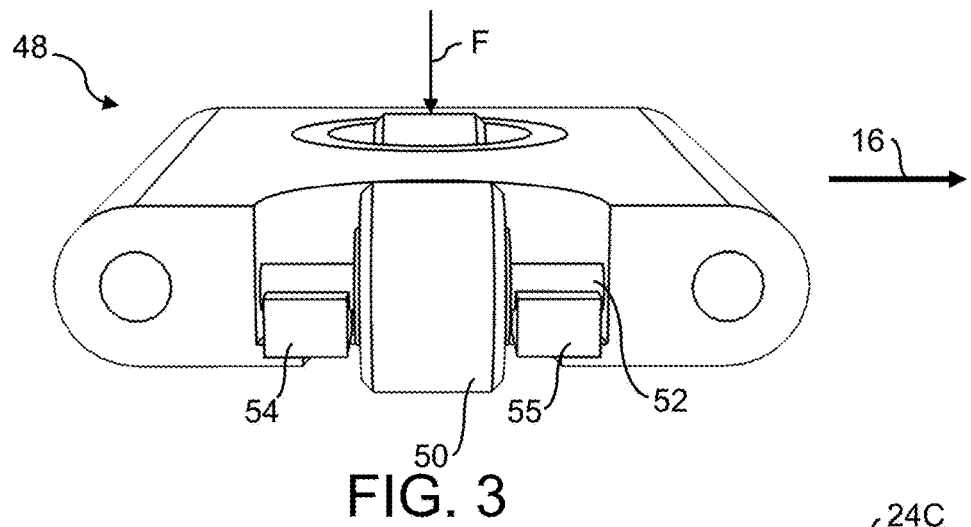
FIG. 3 is a side perspective view of a belt module partly cut away with an embedded weight sensor usable in a weighing system as in FIG. 1.

Instead of being incorporated into the rollers as in FIGS. 2A and 2B, the weight sensor shown in FIG. 3 is embedded in the conveyor belt. The conveyor belt 12 shown in FIG. 1 is a modular conveyor belt constructed of a series of rows 46 of one or more belt modules, such as the module 48 shown in FIG. 3. The rows 46 are hingedly linked together by hinge rods 49 at hinge joints. In this version the roller 50 is mounted on an axle 52 that is oriented parallel to the travel direction 16. The ends of the axle 52 are supported from below on load cells 54, 55 embedded in the module 48. A downward force F on the article-supporting roller 50 is measured by the two load cells 54, 55. The sum of the outputs of the two load cells 54, 55 equals the applied force F. Like the load cells in FIGS. 2A and 2B, the load cells 54, 55 in FIG. 3 are associated with support circuitry to be described later.

Figure 4:
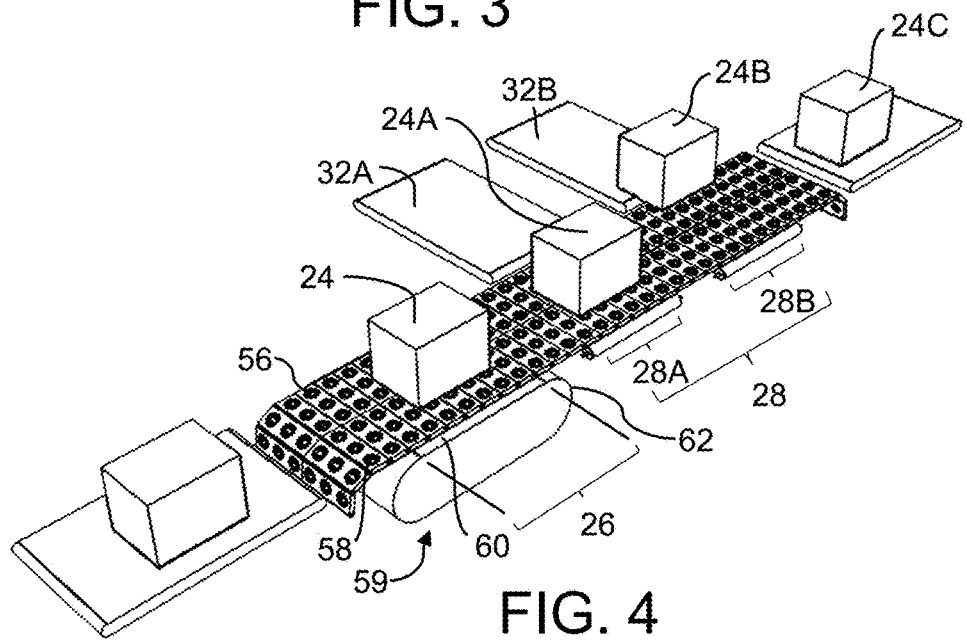
FIG. 4 is a perspective view of another version of a weighing system embodying features of the invention.

FIG. 4 shows another version of a weighing conveyor embodying features of the invention. In this example the roller conveyor belt 56 has rollers 58 like those 18 in FIG. 1, but the belt does not have embedded weight sensors. Instead, the conveyor uses a checkweigher 59 in the weighing zone 26 to weigh the articles 24 as they pass through. The belt rollers 58 extend through the thickness of the belt 56 to support the articles 24 on the top side and to contact the outer weighing surface 60 of a checkweigher belt 62 at the conveyor belt's bottom. The checkweigher has a weight sensor that measures the weight of an article 24 passing through the weighing zone 26. If the weight is outside an acceptable weight range, the belt rollers 58 are actuated in one of the subzones 28A, 28B in the downstream actuation zone 28 to push the out-of-range article 24A, 24B to the appropriate reject conveyor 32A, 32B. If the weight is within range, the belt rollers 58 are deactuated, and the belt conveys the in-range article 24C to the discharge conveyor 34. The roller-actuation-zone 28 could be positioned to coincide with or overlap the weighing zone 26. To prevent articles 24 from being diverted by the rollers 58 in the weighing zone 26, the checkweigher belt 62 runs at the same speed in the travel direction 16 as the roller belt 56. If an article is determined to be out-of-range, the checkweigher belt 62 is halted, which actuates the rollers 58 to sort the article off the roller belt 56 in the coincident weighing zone 26. Instead of a checkweigher belt 62, the checkweigher could use a stationary outer surface, like a scale, across which the belt rides while the weight is measured.

Figure 5:
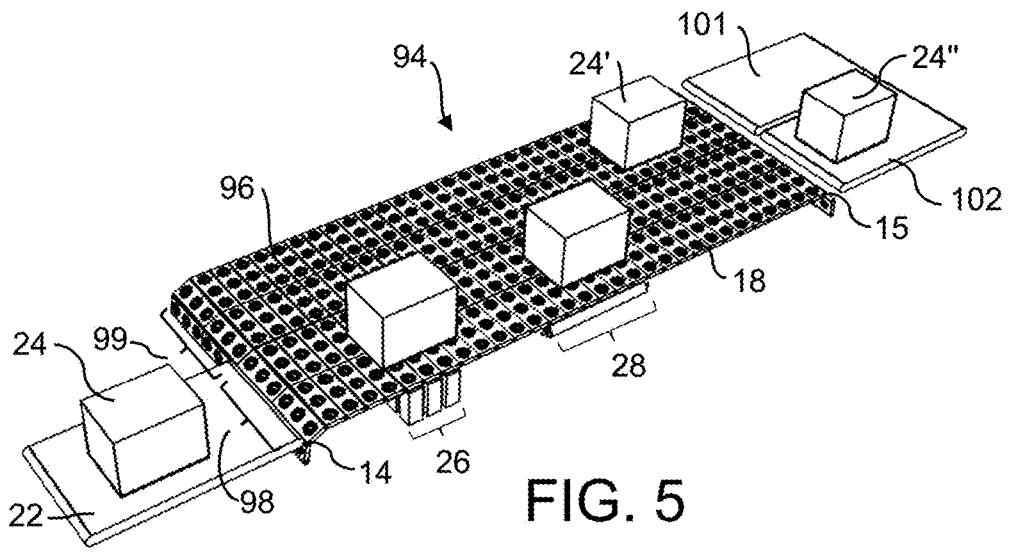
FIG. 5 is a perspective view of a weighing system as in FIG. 1 in a switch configuration.

The weighing system 94 shown in FIG. 5 is operated as a conveyor switch. A roller conveyor belt 96 is divided across its width into two parallel longitudinal lanes 98, 99 that extend from the upstream end 14 to the downstream end 15. The infeed conveyor 22 feeds articles 24 onto the first lane 98 at the upstream end 14 of the conveyor belt 96. The articles 24 are weighed in the first lane 98 in the weighing zone 26. The roller-actuation zone 28 is selectively actuated either only for articles 24 whose weights are in-range or only for articles whose weights are out-of-range. When selectively actuated, the belt rollers 18 divert the articles from the first lane 98 to the second lane 99. Thus, the selectively diverted articles 24' are switched to the second lane 99 to exit the downstream end 15 of the conveyor belt 96 onto a discharge conveyor 101. The roller-actuation zone 28 is deactuated for articles 24" that are not selected to be switched to the second lane 99. Instead, those articles 24" remain in the first lane 98 to exit onto a separate discharge conveyor 102. In another version the conveyor belt comprises two side-by-side abutting conveyor belts, in which the second conveyor belt can be, but does not have to be, a roller belt.

Figure 6:
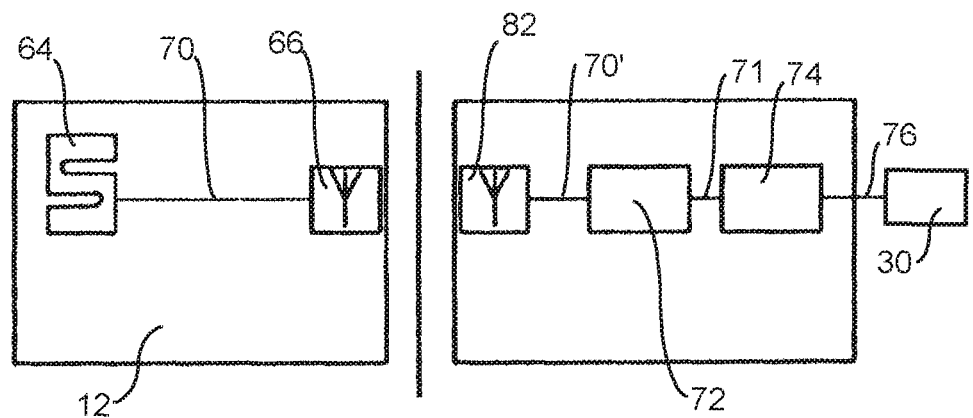
FIGS. 6-8 are schematic block diagrams of three versions of systems for collecting weight data in the weighing system of FIG. 1.
Figure 7:
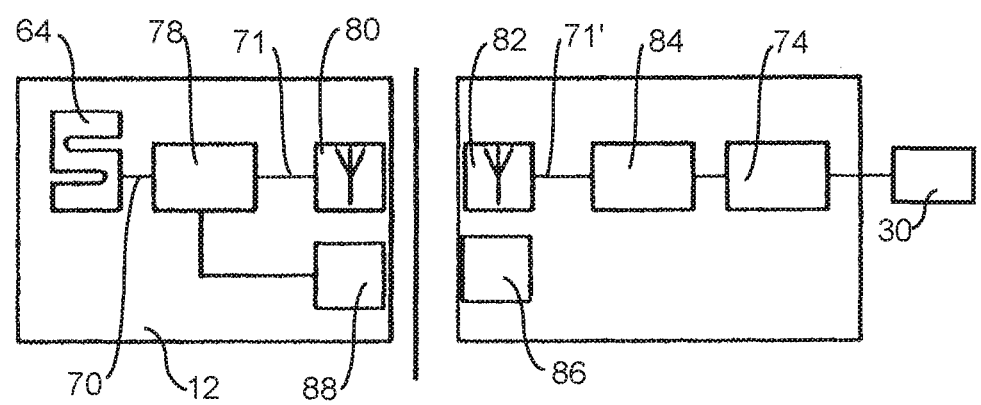
Figure 8:
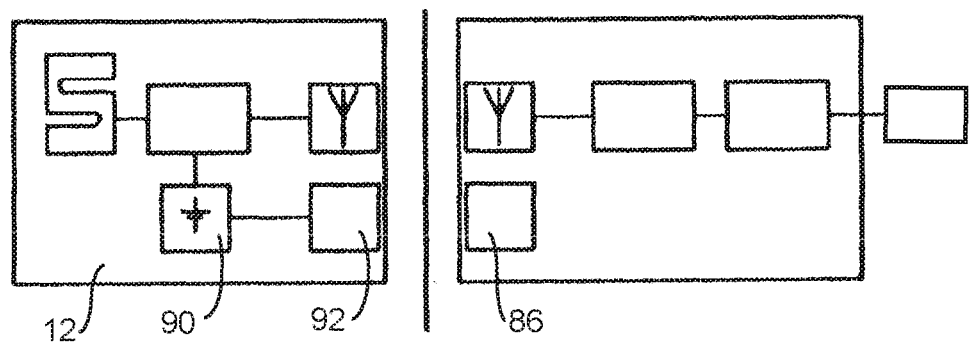

Various ways of collecting and using the weight measurements for weighing conveyors in which the weight sensor is integrated into the conveyor belt or its rollers are shown in FIGS. 6-8. FIG. 6 represents a passive system in which the belt has only passive components. A load cell 64, such as a load cell 38 as in FIGS. 2A and 2B or a load cell 54, 55 as in FIG. 3, in the belt 12 is electrically connected to a transmitter 66 realized as a capacitor plate or a coil. A receiver 82 external to and below the belt 12 in the weighing zone is realized as a second capacitor plate forming a capacitor with the plate in the belt or as a second coil forming a transformer with the coil in the belt. Thus, the weight sensor's weight signal 70 is sent by the transmitter 66 to the external receiver 82 by capacitive or inductive coupling when the sensor 64 is in the weighing zone. The received weight signal is conditioned, including being converted from an analog weight signal 70' into a digital weight signal 71 in a conditioning circuit 72 before being sent to a controller 74, which may be realized as a programmable logic controller or other programmable computing device executing program steps stored in a program memory. The controller 74 also receives weight signals from other weight sensors and, from those signals, determines the weight of an article, compares its weight to a predetermined weight range, classifies the article as out-of-range if its weight is outside the weight range or as in-range if within, and selectively sends an actuation signal 76 to the actuator 30 in the actuation zone for either only the out-of-range articles or only the in-range articles to rotate the belt rollers to divert the in-range and out-of-range articles off the belt along different exit paths.

Another version of support circuitry to transmit weight signals from the belt to the external controller 74 is shown in FIG. 7. The circuitry on board the belt 12 includes the load cell 64, a local controller 78, and a transmitter 80. The analog weight signal 70 is converted to a digital weight signal 71 by the controller 78 and an associated analog-to-digital converter. The digital weight signal 71 is then transmitted by the transmitter to the external receiver 82 while the weight sensor is in the weighing zone. The received digital weight signal 71' passes through an interface circuit 84 on its way to the controller 74, which determines the weight of the article and either actuates or deactuates the belt rollers as they convey the article through the roller-actuation zone. The belt-borne components receive power from an external power supply 86, which is coupled to a power receiver 88 including a voltage regulator, in the belt. Power transfer to the power receiver 88 can be by inductive or capacitive coupling, by light transmission, or by sliding electrical contacts, as just a few examples.

Yet another version of support circuitry is shown in FIG. 8, which is similar to FIG. 7, except that FIG. 8 shows a storage element 90, such as one or more dry cells or capacitors, powering the weight-sensor circuit. The external power source 86 is optionally coupled to a local charging circuit 92 in the belt to recharge the rechargeable storage element 90 wirelessly or via contacts.

Although the invention has been described in detail with regard to two versions, other versions are possible. For example, not all the rollers have to be weighing rollers. As another example, the in-range rather than the out-of-range articles could be diverted off the side of the belt while the out-of-range articles pass straight through the roller-actuation zone and off the end of the belt. For belts with roller balls or rollers on axles parallel to the travel direction, the rollers can be actuated to divert in-range articles off one side of the belt and out-of-range articles off the other side. And different kinds of roller-actuation mechanisms can be used. For example, a flat plat that is movable up and down into and out of contact with the belt rollers by a linear actuator can be used to actuate and deactuate the oblique belt rollers. Or the mechanism can raise and lower long actuating rollers whose axes of rotation are parallel to the travel direction into and out of contact with the oblique belt rollers to actuate and deactuate them. For use with belt rollers whose axes of rotation are parallel to the travel direction, the roller-actuating mechanism can use shorter caster rollers whose axes of rotation are oriented oblique left or right to the travel direction to rotate the belt rollers to push articles off one side of the belt or the other. Or the rollers can be made of electrically conductive or magnetic materials with poles and selectively actuated by a linear-motor stator in the roller-actuation zone. So, as these examples suggest, the invention is not meant to be limited to the exemplary versions described in detail.

What is claimed is:

1. A weighing system comprising:
    a conveyor belt arranged to advance in a travel direction along a travel path from an upstream end to a downstream end and having a plurality of article-supporting rollers actuatable to rotate toward a side of the conveyor belt in a transverse direction transverse to the travel direction;
    a weighing zone extending along a first length of the travel path in which one or more weight sensors mounted in the conveyor belt and coupled to the rollers to measure downward forces on the rollers applied by articles atop the rollers and produce weight signals indicative of the weights of the articles proportional to the downward forces;
    a roller-actuation zone extending along a second length of the travel path in which an actuator selectively actuates the article-supporting rollers as they pass through to push articles in the transverse direction;
    a controller:
        receiving the weight signals;
        determining the weights of the articles from the weight signals;
        selectively actuating and deactuating the rollers passing through the roller-actuation zone as a function of the weights of the articles.

2. A weighing system as in claim 1 wherein the roller-actuation-zone along the second length is downstream of the weighing zone along the first length.

3. A weighing system as in claim 1 wherein the roller-actuation-zone along the second length overlaps the weighing zone along the first length.

4. A weighing system as in claim 1 wherein the roller-actuation-zone and the second length coincide with the weighing zone and the first length.

5. A weighing system as in claim 1 wherein the controller compares the weights to a predetermined weight range, classifies articles whose weights are outside the weight range as out-of-range articles and articles whose weights are within the weight range as in-range articles, and actuates the article-supporting rollers passing through the roller-actuation zone to rotate in the transverse direction either for only the out-of-range articles or for only the in-range articles, whereby the out-of-range articles and the in-range articles exit the conveyor belt along different paths.

6. A weighing system as in claim 5 comprising a first conveyor at the side of the roller-actuation zone and a second conveyor at the downstream end of the travel path and wherein the controller actuates the article-supporting rollers passing through the roller-actuation zone for out-of-range articles to push the out-of-range articles in the transverse direction onto the first conveyor and deactuates the article-supporting rollers passing through the roller-actuation zone for in-range articles to convey the in-range articles to the second conveyor.

7. A weighing system as in claim 5 wherein the conveyor belt has adjacent first and second lanes extending from the upstream end to the downstream end and wherein the weighing system comprises:
    an infeed conveyor feeding articles onto the first lane of the conveyor belt at the upstream end;
    wherein only the first lane extends through the weighing zone;
    wherein the controller actuates the article-supporting rollers passing through the roller-actuation zone for either only the out-of-range articles or only the in-range articles to direct either only the out-of-range articles or the in-range articles to the second lane.

8. A weighing system as in claim 1 comprising a plurality of roller-actuation subzones in the roller-actuation zone.

9. A weighing system as in claim 8 wherein the controller compares the weights to a plurality of predetermined weight ranges each corresponding to one of the roller-actuation subzones and actuates the article-supporting rollers passing through the roller-actuation subzone corresponding to the weight range each article's weight falls in.

10. A weighing system as in claim 1 wherein the conveyor belt includes axles defining axes parallel or oblique to the travel direction about which article-supporting rollers rotate.

11. A weighing system as in claim 1 wherein the rollers are roller balls.

12. A weighing system as in claim 1 wherein the rollers are stacked rollers.

13. A weighing system as in claim 1 wherein the controller is external to the conveyor belt.

14. A weighing system as in claim 13 further including receivers external to the conveyor belt and wherein the conveyor belt includes transmitters that receive the weight signals from the weight sensors and transmit the weight signals to the receivers, which send the weight signals to the controller.

15. A weighing system as in claim 14 wherein the weight sensors and the transmitters reside in the rollers.

16. A weighing system as in claim 14 wherein the weight sensors and the transmitters are passive and powered via inductive or capacitive coupling between the receivers and the transmitters.

17. A weighing system as in claim 14 wherein the conveyor belt includes local controllers between the weight sensors and the transmitters converting the weight signals into digital weight signals transmitted by the transmitters to the receivers.

18. A weighing system as in claim 14 further comprising a power source external to the conveyor belt and wherein the conveyor belt includes rechargeable storage elements powering the weight sensors and local charging circuits connected to the rechargeable storage elements and coupled to the power source external to the conveyor belt to recharge the rechargeable storage elements from the power source.

19. A weighing system as in claim 1 wherein the conveyor belt includes axles on which the rollers are mounted and wherein the weight sensors are connected between the ends of the axles and the conveyor belt.

20. A weighing system comprising:
a conveyor belt arranged to advance in a travel direction along a travel path from an upstream end to a downstream end and having a plurality of article-supporting rollers actuatable to rotate toward a side of the conveyor belt in a transverse direction transverse to the travel direction;
a weighing zone extending along a first length of the travel path in which one or more weight sensors measure the weights of articles conveyed by the conveyor belt and produce weight signals indicative of the weights of the articles;
a roller-actuation zone extending along a second length of the travel path in which an actuator selectively actuates the article-supporting rollers as they pass through to push articles in the transverse direction;
a controller:
receiving the weight signals;
determining the weights of the articles from the weight signals;
selectively actuating and deactuating the article-supporting rollers passing through the roller-actuation zone as a function of the weights of the articles;
wherein the weight sensor is a checkweigher below the conveyor belt having a weighing surface in contact with the rollers passing through the weighing zone.

21. A weighing system as in claim 20 wherein the checkweigher includes a belt and the weighing surface is the outer surface of the belt.

22. A conveyor belt comprising:
a series of rows of one or more belt modules hingedly linked together;
a plurality of article-supporting rollers mounted in the belt;
a plurality of weight sensors coupled to the rollers to measure downward forces on the rollers applied by articles atop the rollers and to produce weight signals proportional to the downward forces.

23. A conveyor belt as in claim 22 wherein the weight sensors are mounted in the rollers.

24. A conveyor belt as in claim 22 further comprising a plurality of axles on which the rollers are mounted for rotation and wherein the weight sensors are connected to the ends of the axles.

25. A conveyor belt as in claim 22 comprising transmitters receiving the weight signals produced by the weight sensors and transmitting the weight signals.

26. A method for selectively separating articles by weight, the method comprising:
conveying articles atop belt rollers in a conveyor belt in a travel direction;
weighing the articles with one or more weight sensors mounted in the conveyor belt and coupled to the belt rollers to measure the weights of the articles from the downward forces on the belt rollers applied by the articles atop the belt rollers as the articles are conveyed atop the belt rollers through a weighing zone;
comparing the weights of the articles to a predetermined weight range;
selectively actuating and deactuating the rollers passing through a roller-actuation zone as a function of the weights of the articles.

27. The method of claim 26 comprising:
classifying articles whose weights are outside the weight range as out-of-range articles and articles whose weights are within the weight range as in-range articles;
selectively actuating the belt rollers after weighing to rotate in a direction transverse to the travel direction for either only the out-of-range articles or only the in-range articles to direct the out-of-range articles and the in-range articles along different exit paths.

* * * * *